(12) United States Patent
Amsterdam et al.

(10) Patent No.: US 9,015,738 B2
(45) Date of Patent: *Apr. 21, 2015

(54) VIDEO STREAM MEASUREMENT

(71) Applicant: International Business Machines Corporation, Armonk, NY (US)

(72) Inventors: Jeffrey D. Amsterdam, Roswell, GA (US); Stephen C. Hammer, Marietta, GA (US); Christopher E. Holladay, Marietta, GA (US); Brian M. O'Connell, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/024,160

(22) Filed: Sep. 11, 2013

(65) Prior Publication Data
US 2014/0013346 A1    Jan. 9, 2014

Related U.S. Application Data

(63) Continuation of application No. 12/628,288, filed on Dec. 1, 2009, now Pat. No. 8,566,856.

(51) Int. Cl.
*H04H 60/33* (2008.01)
*H04H 60/32* (2008.01)
(Continued)

(52) U.S. Cl.
CPC .......... *H04N 21/4394* (2013.01); *H04H 60/33* (2013.01); *H04N 21/4305* (2013.01);
(Continued)

(58) Field of Classification Search
CPC ................. H04N 21/4394; G06F 3/04883
USPC .......... 725/10, 13, 14, 16, 18, 109, 110, 114, 725/118, 131, 139, 151, 32, 135, 136
See application file for complete search history.

(56) References Cited

U.S. PATENT DOCUMENTS 6,771,881 B1    8/2004    Ketcham
7,260,823 B2    8/2007    Schlack et al.
(Continued)

FOREIGN PATENT DOCUMENTS

CN    101282248    10/2008
CN    202505365    8/2009
(Continued)

OTHER PUBLICATIONS

Siemens AG, Juergen Carstens et al.; Counting of Viewing Rates in Mobile TV and IP TV; Jul. 10, 2008; Nokia Siemens Networks 2008; 2 pages.
(Continued)

*Primary Examiner* — Pinkal R Chokshi
(74) *Attorney, Agent, or Firm* — Schmeiser, Olsen & Watts; Matthew Chung

(57) ABSTRACT

A video stream measurement method and system. The method includes receiving by a computing system, a video stream comprising plurality of timestamps located at specified intervals of the video stream. The computing system broadcasts the video stream for a user and decodes a first time stamp broadcasted during a first time period. The computing system monitors a user interaction function performed by the user and associated with the video stream. The computing system generates and transmits a report comprising a description associated with the user interaction function. The computing system receives an analysis associated with the report.

20 Claims, 3 Drawing Sheets

(51) Int. Cl.

| | | |
|---|---|---|
| *H04N 7/173* | (2011.01) | |
| *H04N 21/439* | (2011.01) | |
| *H04N 21/43* | (2011.01) | |
| *H04N 21/442* | (2011.01) | |
| *H04N 21/47* | (2011.01) | |
| *H04N 21/658* | (2011.01) | |
| *H04N 21/81* | (2011.01) | |
| *H04H 20/82* | (2008.01) | |

(52) U.S. Cl.
CPC ......... *H04N21/44209* (2013.01); *H04N 21/47* (2013.01); *H04N 21/6582* (2013.01); *H04N 21/812* (2013.01); *H04H 20/82* (2013.01)

(56) References Cited

U.S. PATENT DOCUMENTS

| | | |
|---|---|---|
| 7,363,643 B2 | 4/2008 | Drake et al. |
| 7,908,616 B2 | 3/2011 | Jeong |
| 8,374,590 B1 | 2/2013 | Mikan et al. |
| 8,566,856 B2 | 10/2013 | Amsterdam et al. |
| 2002/0056086 A1 | 5/2002 | Yuen et al. |
| 2003/0172131 A1 | 9/2003 | Ao et al. |
| 2004/0045020 A1 | 3/2004 | Witt et al. |
| 2004/0046790 A1 | 3/2004 | Agarwal et al. |
| 2004/0261102 A1 | 12/2004 | Itoh |
| 2007/0021065 A1 | 1/2007 | Sengupta et al. |
| 2007/0050832 A1 | 3/2007 | Wright et al. |
| 2007/0157247 A1 | 7/2007 | Cordray et al. |
| 2007/0294096 A1 | 12/2007 | Randall et al. |
| 2007/0294126 A1 | 12/2007 | Maggio et al. |
| 2008/0092168 A1 | 4/2008 | Logan et al. |
| 2008/0165760 A1 | 7/2008 | Challapali et al. |
| 2008/0263579 A1 | 10/2008 | Mears et al. |
| 2009/0089445 A1 | 4/2009 | Deshpande |
| 2009/0172736 A1 | 7/2009 | Tsui et al. |
| 2009/0228910 A1 | 9/2009 | Christinat et al. |
| 2009/0254932 A1 | 10/2009 | Wang et al. |
| 2010/0153831 A1* | 6/2010 | Beaton .......................... 715/201 |
| 2011/0088052 A1 | 4/2011 | Ramaswamy et al. |
| 2011/0131596 A1 | 6/2011 | Amsterdam et al. |
| 2012/0260279 A1 | 10/2012 | Matz et al. |

FOREIGN PATENT DOCUMENTS

| | | |
|---|---|---|
| JP | 2002056280 | 2/2002 |
| JP | 2009110521 | 5/2009 |
| WO | 2008103829 | 8/2008 |

OTHER PUBLICATIONS

P. Mariadoss; Dossier CHA9-2008-0008; Performing Real-Time Analytics Using a Network Processing Solution Able to Directly Ingest IP Camera Video Streams; pp. 1-3.

Office Action (Mail Date Sep. 20, 2012) for U.S. Appl. No. 12/628,288, filed Dec. 1, 2009.

Amendment filed Dec. 13, 2012 filed in response to Office Action (Mail Date Sep. 20, 2012) for U.S. Appl. No. 12/628,288, filed Dec. 1, 2009.

Final Office Action (Mail Date Jan. 7, 2013) for U.S. Appl. No. 12/628,288, filed Dec. 1, 2009.

Amendment After Final with Request for Continued Examination filed Mar. 7, 2013 in response to Final Office Action (Mail Date Jan. 7, 2013) for U.S. Appl. No. 12/628,288, filed Dec. 1, 2009.

Notice of Allowance (Mail Date Jun. 14, 2013) for U.S. Appl. No. 12/628,288, filed Dec. 1, 2009.

\* cited by examiner

VIDEO STREAM MEASUREMENT

This application is a continuation application claiming priority to Ser. No. 12/628,288 filed Dec. 1, 2009, now U.S. Pat. No. 8,566,856, issued Oct. 22, 2013.

FIELD

The present invention relates to a method and associated system for measuring and analyzing a video stream broadcasted for a user.

BACKGROUND

Monitoring data and associated functions typically comprises an inaccurate process with little flexibility. Systems performing data monitoring processes typically transmit the data without the ability to enable any feedback associated with the data. Transmitting the data without the ability to enable any feedback associated with the data limits any flexibility to account for changes within the systems.

SUMMARY

The present invention provides a method comprising:
receiving, by a computer processor of a computing system, a video stream comprising plurality of timestamps located at specified intervals of said video stream;
broadcasting, by said computer processor for a user, said video stream;
during said broadcasting, first decoding by said computer processor, a first time stamp of said plurality of time stamps, said first time stamp broadcasted during a first time period;
during said first decoding, monitoring by said computer processor, a first user interaction function associated with said video stream, said first user interaction function performed by said user during a broadcast of a first portion of said video stream, said broadcast of said first portion of said video stream occurring at said time stamp;
generating, by said computing system, a report, said report comprising a first description associated with said first user interaction function and said first time period associated with said first time stamp;
transmitting, by said computer processor to an analysis computing system, said report; and
receiving, by said computer processor from said analysis computing system, an analysis associated with said report.

The present invention advantageously provides a simple method and associated system capable of monitoring data and associated functions.

DETAILED DESCRIPTION

Figure 1:
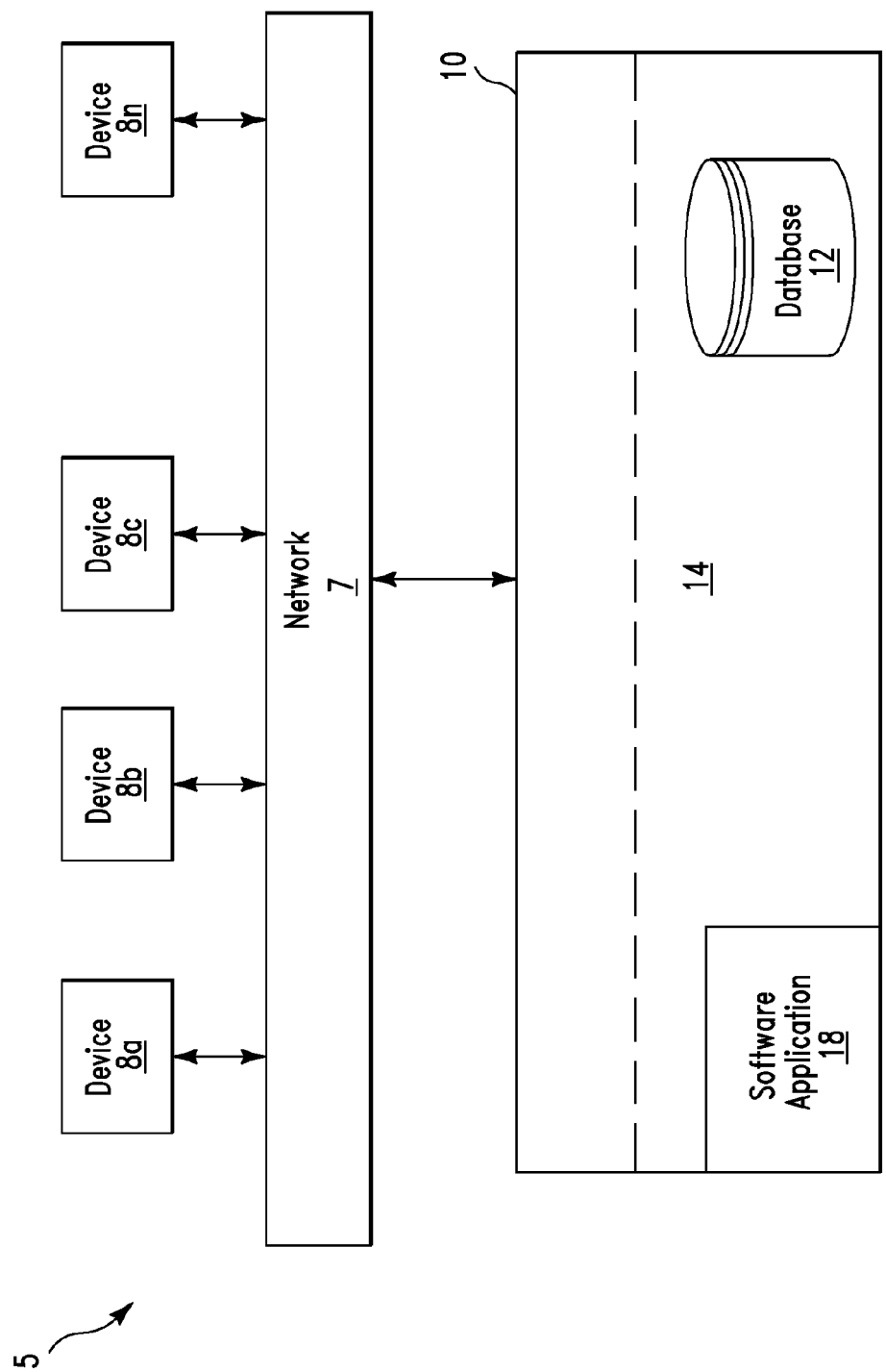
FIG. 1 illustrates a system for measuring and analyzing a video stream broadcasted for a user, in accordance with embodiments of the present invention.

FIG. 1 illustrates a system 5 for measuring and analyzing a video stream broadcasted for a user, in accordance with embodiments of the present invention. System 5 monitors and reports user interactions and analytics associated with a broadcasted video stream (e.g., internet based streaming video). The analytics may be used to automatically determine where advertising may be inserted into a video stream. System 5 may additionally generate a summary (i.e., based on the analytics) video for downloading. A measurement process may comprise inserting timestamp meta-data into a streaming video, discovering the timestamp meta-data by a media player, transmitting (i.e., to a web-analytics server) the discovery of the timestamp meta-data, and analyzing user functions performed with reference to the timestamp meta-data.

System 5 of FIG. 1 comprises devices $8a \ldots 8n$ connected through a network 7 to a computing system 10. Network 7 may comprise any type of network including, inter alia, a local area network, (LAN), a wide area network (WAN), the Internet, etc. Devices $8a \ldots 8n$ may comprise any type of devices capable of broadcasting a video stream, inter alia, a personal computer, a laptop computer, a computer terminal, a cellular telephone, a digital assistant (PDA), a video game system, an audio/video player, etc. Each of devices $8a \ldots 8n$ may comprise a single device or a plurality of devices. Devices $8a \ldots 8n$ are used by end users for receiving and viewing audio/video streaming broadcasts. Computing system 10 may comprise any type of computing system(s) including, inter alia, a personal computer (PC), a server computer, a database computer, etc. Computing system 10 is used for:

1. Inserting time stamps into a video data stream.
2. Transmitting the video stream (i.e., comprising the time stamps) to any of devices $8a \ldots 8n$.
3. Receiving interaction data (i.e., from any of devices $8a \ldots 8n$) associated with user functions performed during a broadcast of the video stream (i.e., by any of devices $8a \ldots 8n$).
4. Analyzing the interaction data.
5. Transmitting an analysis of the interaction data and any associated instructions to the devices $8a \ldots 8n$ or an external entity (e.g., an advertiser).

Computing system 10 comprises a memory system 14. Memory system 14 may comprise a single memory system. Alternatively, memory system 14 may comprise a plurality of memory systems. Memory system 14 comprises a software application 18 and a database 12. Database 12 comprises all analysis data associated with user interactions related to a video stream. Software application 18 enables a method to measure and analyze a video stream broadcasted for a user. Software application 18 enables a process for measuring and analyzing a video stream broadcasted for a user as follows.

Computing system 10 (i.e., via software application 18) inserts timestamp meta-data into a live encoded on-demand video stream. The video stream is transmitted to a client (e.g., any of devices $8a \ldots 8n$). When the client receives each timestamp in the meta-data, the client invokes a measurement reporting process. A measurement interval associated with insertion points for (i.e., in the video stream) for the meta-data time stamps will determine how fine-grained a final analysis may be. Software application 18 may report partial video segments if a user interrupts the video between measurement intervals. A measurement reporting method is invoked with additional parameters to differentiate from live, on-demand, or reviewed video. User interaction information such as, inter alia, window focus, mouse movement, mouse clicks within the player, etc. may also be recorded via system 5 for analytic purposes. The user interaction information may be used to validate or invalidate video stream measurement statistics. The user interaction information may be used to determine if a user is actively watching a video stream or if the user has the video stream playing on their system without paying attention to it. Examples of user interaction information retrieved by software application 18 are described as follows:

Window Focus Information

Software application 18 may detect if a video player (e.g., a software video media player on one of devices 8a . . . 8n) is in focus through method calls to an operating system. When a video window (i.e., of a software video media player) focus changes, the change is recorded by software application 18. Window focus may indicate if a user is actively viewing streaming video media.

Mouse Movement Information

Software application 18 may detect mouse movement within a video window (i.e., of a software video media player). Additionally, software application 18 may detect mouse movement external to the video window using method calls to an operating system. Mouse movement indicates that a user is actively interacting with the computer and therefore likely watching the video streaming. Retrieving mouse movement information in combination with the window focus information allows software application 18 to an accurate depiction of a user's attentiveness to a video.

Volume Information

Software application 18 may detect a current volume of a software video media player and/or system. During a video stream measurement transmission, a state of the volume may be transmitted. Volume or lack of volume indicates if a user has heard any audio associated with the video stream during a specified time period. This measurement may be helpful to potential advertisers.

Software application 18 enables a process for analyzing an embedded time code compared to a relative reported system time in order to determine an increased buffer time or lag time for each end user. If software application 18 discerns that a quality of the video stream is below a threshold, software application 18 may alter the video stream or direct the user to a new video stream that consumes less bandwidth to enhance the video quality.

Devices 8a . . . 8n may report measurements using any method including, inter alia, HTTP over TCP/IP, etc. Devices 8a . . . 8n may enable an HTTP request to a measurement server (e.g., software application 18) and an associated measurement is recorded by the server and used for analytics. Any subset of the measurements or additional information may be transmitted with the measurement requests. Software application 18 enables generation of measurement reports comprising how many people viewed a live video stream at any given time, metrics associated with portions of an on-demand video section, and a determination of which advertisements were viewed (if advertisements were embedded in a primary video stream). If advertisements were displayed as separate sections, they could be likewise measured as separate sections. Software application 18 analyzes measurements to determine:

1. How much of a video stream a user has watched.
2. Which segments (and an order of the video segments) of a video stream have been viewed
3. Which segments of a video stream have been skipped.
4. Which segments of a video stream have been viewed more than once in a viewing session.

The following implementation example illustrates a process for measuring and analyzing a video stream broadcasted for a user. Initially, a video stream is embedded with timestamps every ten seconds. Note that the ten second interval may be modified up or down to increase or decrease a granularity of measurement calls. The video stream embedded with timestamps is transmitted from streaming server computing system (e.g., computing system 10) to a client application (i.e., a web video console of devices 8a . . . 8n). The client application displays the video stream for a user. As the client application displays the video stream it will also receive meta-data which has been inserted into the video stream (i.e., comprising embedded time stamps). When the client application receives a timestamp, it transmits a measurement call. This process begins by collecting a current time. The client application additionally collects data which may enhance measurement of the video stream. In this example the following data is collected:

1. An average volume since a last measurement call.
2. A Boolean value indicating if there was any mouse movement or clicks within the client application since a last measurement call.
3. A percentage value indicating how long the client application comprised a focused window since a last measurement call
4. A count of buffering events.

Additionally, a measurement service will generate a unique ID number for each client session.

The aforementioned retrieved measurement data is formatted into a text block and the text block is transmitted to the measurement server through an HTTP call from the client application. The measurement server accesses the measurement data and generates real-time reports. If a measurement value exceeds a specified threshold, a manual or automatic process may add instructions to the video stream as additional meta-data. In this example the measurement process reviews a variety of data points from the measurement calls. User activity, video performance, DVR activity, segments viewed, concurrent streams, max clients, are max streams are all reviewed. User activity is used to determine if a user is actually watching a video stream. Since each video stream served comprises an incremental cost, the video stream producers want to limit unwatched streams. During processing, the measurement server determines that a client with an id of 1234 has not had any activity in the past 30 minutes. A message is transmitted to an encoding process which embeds the id of 1234 and a message code of 1 into the video stream as meta-data. All client applications receive the message, but only client 1234 processes this message since it has a matching client id. The message code of 1, instructs the client video player to display a message to the user asking them to click a button if they are still watching. If the button is not clicked, the video client automatically disables the video stream after a specified time period. Additionally, the aforementioned method may be used for a live video performance. Based on a video lag (i.e., calculated as the difference between a video timestamp and a real time timestamp) and buffering events, a code may be transmitted to the client application. The code instructs the client application to switch to an alternative video stream. The alternative video stream may comprise a lower bit rate stream or may comprise a video stream from a different server which may be geographically closer (i.e., for improved network performance). The additional data, segments viewed, concurrent streams, max clients, and max streams are all reviewed by video producers to make business decisions about the video streams. Concurrent streams and max values are calculated using unique client ids and a series of measurement calls from each client application. Video segments viewed are calculated by looking at reported video timestamps. Each timestamp represents a segment of video 10 seconds long which ends at a timestamp time. As the timestamps are reported in measurement calls, a profile is generated illustrating which parts of the video are being displayed at any given time. In this example, the client application and video server comprise digital video recorder (DVR) capabilities, which allow users to rewind or pause a video and does not guarantee all users are watching a live version of the video stream. The details of these viewership patterns are available because of the timestamp based measurement technique described, supra.

Figure 2:
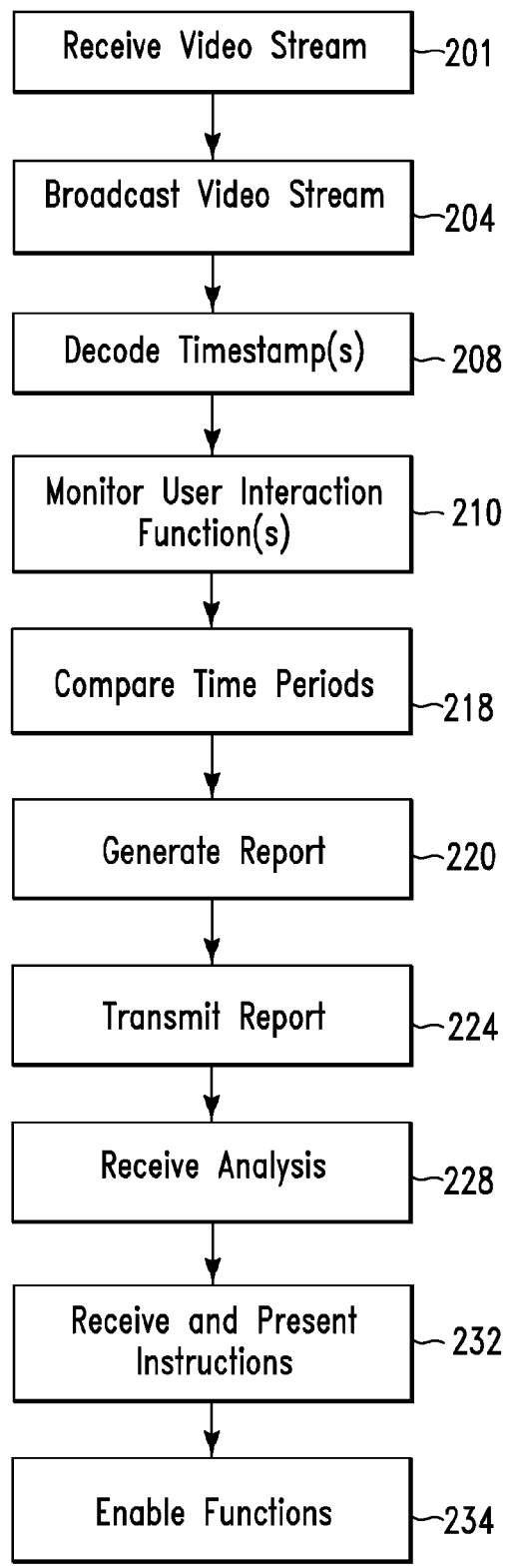
FIG. 2 illustrates a flowchart describing an algorithm used by the system of FIG. 1 for implementing a method for measuring and analyzing a video stream broadcasted for a user, in accordance with embodiments of the present invention.

FIG. 2 illustrates a flowchart describing an algorithm used by system 5 of FIG. 1 for implementing a method for measuring and analyzing a video stream broadcasted for a user, in accordance with embodiments of the present invention. In step 201, a computing system (e.g., devices 8a . . . 8n of FIG. 1) receives a video stream comprising plurality of timestamps located at specified intervals of the video stream. In step 204, the computing system broadcasts the video stream for a user. In step 208, (i.e., as the video stream is broadcasted for the user) the computing system decodes time stamps (i.e., from the video stream) at different time periods. In step 210, the computing system monitors user interaction functions (e.g., comprising measurements) performed by the user and associated with the video stream. The measurements may include, inter alia:

1. A window focus percentage measurement occurring during the broadcast of a portion of the video stream.
2. A mouse movement measurement occurring during the broadcast of a portion of the video stream.
3. An increased buffer time/lag associated with the broadcast the video stream.
4. An average volume level for an audio stream associated with the video stream occurring during the broadcast of said video stream.

The measurements may be compiled into usage statistics and viewing patterns associated with the video stream. The measurements occur at different time periods with reference to the time stamps. In step 218, the different time periods (i.e., associated with the time stamps of step 208 or reference time periods) are optionally compared to each other to determine differences. For example, different time periods associated with different time stamps (i.e., associated with the measurements) may be compared to each other to determine differences. Alternatively, different time periods associated with different time stamps (i.e., associated with the measurements) may be compared to predetermined reference time periods to determine differences. Additionally, different time periods associated with different time stamps (i.e., associated with the measurements) may be compared to each other and predetermined reference time periods to determine differences. In step 220, the computing system generates a report comprising a descriptions associated with the first user interaction functions, the time periods of step 208, and the differences of step 218. In step 224, the computing system transmits the report to an analysis computing system (e.g., computing system 10 of FIG. 1). In step 228, the computing system receives (i.e., from the analysis computing system) an analysis report (generated by the analysis computing system) generated from information on the report of step 220. In step 232, the computing system receives (i.e., from the analysis computing system) instructions (and optionally load data indicating a current capacity and load associated with the computing system) associated with the analysis and the video stream. The instructions may be received as meta data inserted in the video stream. The instructions comprise commands for performing specified functions associated with the video stream. For example, the instructions may command the user of the computing system to, inter alia, disable the video stream and enable a replacement video stream, adjust a focus of the video stream, adjust a volume of an audio signal associated with the video stream, etc. In step 234, the computing system (optionally) automatically enables the commands associated with the instructions.

Figure 3:
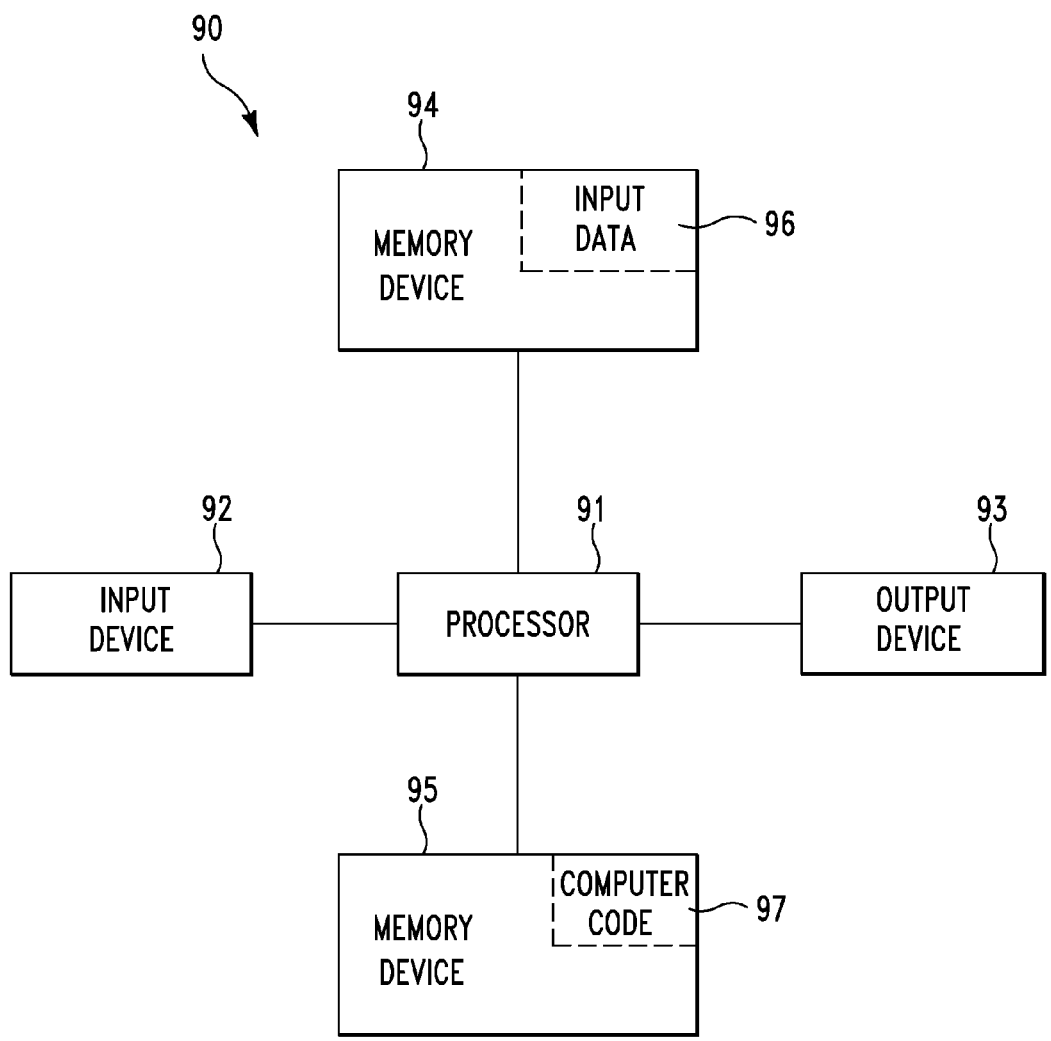
FIG. 3 illustrates a computer apparatus used for measuring and analyzing a video stream broadcasted for a user, in accordance with embodiments of the present invention.

FIG. 3 illustrates a computer apparatus 90 (e.g., computing system 10 or devices 8a . . . 8n of FIG. 1) used for implementing a method for measuring and analyzing a video stream broadcasted for a user, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for implementing a method for measuring and analyzing a video stream broadcasted for a user. The processor 91 enables the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithms of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to implement a method for measuring and analyzing a video stream broadcasted for a user. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for implementing a method for measuring and analyzing a video stream broadcasted for a user. In another embodiment, the invention provides a method that performs the process steps of the invention on a subscription, advertising, and/or fee basis. That is, a service provider, such as a Solution Integrator, could offer to implement a method for measuring and analyzing a video stream broadcasted for a user. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
broadcasting, by a computer processor of a computing system for a user, a video stream comprising plurality of timestamps located at specified intervals of said video stream;
during said broadcasting, first decoding by said computer processor, a first time stamp of said plurality of time stamps, said first time stamp broadcasted during a first time period;
during said first decoding, monitoring by said computer processor, a first user interaction function associated with said video stream, said first user interaction function performed by said user during a broadcast of a first portion of said video stream, said broadcast of said first portion of said video stream occurring at said first time stamp;
first determining, by said computer processor, based on said first user interaction function and additional previous user interaction functions, various portions of said video stream that have been actively viewed by said user;
second determining, by said computer processor, based on results of said first determining, video portions of additional video for adding to said video stream;
generating, by said computing system, a report, said report comprising a first description comprising analysis associated with said first user interaction function, said additional previous user interaction functions, and said first time period associated with said first time stamp, wherein said first description comprises first measurements associated with said first user interaction function, wherein said first measurements are configured to be compiled into usage statistics and viewing patterns associated with said video stream, and wherein said first measurements comprise:
    measuring a window focus percentage, through method calls to an operating system, occurring during said broadcast of said first portion of said video stream;
    measuring a mouse movement occurring during said broadcast of said first portion of said video stream, wherein said mouse movement occurs within and external to a video window broadcasting said first portion of said video stream; and
    measuring an average volume level for an audio stream associated with said video stream occurring during said broadcast of said first portion of said video stream;
transmitting, by said computer processor to an analysis computing system, said report; and
receiving, by said computer processor from said analysis computing system, an analysis associated with said report.

2. The method of claim 1, further comprising:
receiving, by said computer processor from said analysis computing system, instructions associated with said analysis and said video stream; and
presenting, by said computer processor to said user, said instructions.

3. The method of claim 1, further comprising:
receiving, by said computer processor from said analysis computing system, instructions associated with said analysis and said video stream; and
automatically enabling, by said computer processor in response to said instructions, specified functions associated with said broadcasting said video stream.

4. The method of claim 1, further comprising:
comparing, by said computer processor, said first time period to a reference time period to determine a difference between said first time period and said reference time period, wherein said report comprises said difference.

5. The method of claim 1, further comprising:
during said broadcasting and after said first decoding, second decoding by said computer processor, a second time stamp of said plurality of time stamps, said first time stamp broadcasted during a first time period;
during said second decoding, monitoring by said computer processor, a second user interaction function associated with said video stream, said second user interaction function performed by said user during a broadcast of a second portion of said video stream, said broadcast of said second portion of said video stream occurring at said second stamp, said broadcast of said second portion of said video stream occurring after said broadcast of said first portion of said video stream; and
comparing, by said computer processor, said first time period to said second time period to determine a difference between said first time period and said second time period, wherein said report comprises said difference.

6. The method of claim 5, further comprising:
comparing, by said computer processor, said difference to a reference time period to determine an additional difference between said first time period and said reference time period, wherein said report comprises said additional difference;
receiving, by said computer processor from said analysis computing system in response to said report, an indication that said broadcasting said video stream comprises a specified lag time;
receiving, by said computer processor from said analysis computing system, instructions associated with said analysis and said indication; and
presenting, by said computer processor to said user, said instructions.

7. The method of claim 6, wherein said instructions are received via metadata inserted with said video stream.

8. The method of claim 6, wherein said instructions comprise information requesting said user disable said broadcasting said video stream and switch to broadcasting a replacement video stream.

9. The method of claim 7, further comprising:
comparing, by said computer processor, said difference to a reference time period to determine an additional difference between said first time period and said reference time period, wherein said report comprises said additional difference;

receiving, by said computer processor from said analysis computing system in response to said report, an indication that said broadcasting said video stream comprises a specified lag time;

receiving, by said computer processor from said analysis computing system, instructions associated with said analysis and said indication; and automatically enabling, by said computer processor in response to said instructions, specified functions associated with said broadcasting said video stream.

10. The method of claim 9, wherein said automatically enabling said specified functions comprises:

automatically disabling, by said computer processor, said broadcasting said video stream; and automatically enabling, by said computer processor, broadcasting a replacement video stream.

11. The method of claim 7, further comprising:

comparing, by said computer processor, said difference to a reference time period to determine an additional difference between said first time period and said reference time period, wherein said report comprises said additional difference; and transmitting, by said computer processor to said analysis computing system, load data indicating a current load and capacity associated with said computing system.

12. The method of claim 11, further comprising:

receiving, by said computer processor based on said load data, an additional plurality of timestamps located at additional specified intervals of said video stream.

13. The method of claim 11, further comprising:

receiving, by said computer processor based on said load data, said video stream comprising removed time stamps from plurality of timestamps.

14. The method of claim 1, wherein said plurality of timestamps are comprised by metadata.

15. A process for supporting computer infrastructure, said process comprising providing at least one support service for at least one of creating, integrating, hosting, maintaining, and deploying computer-readable code by said computer processor, wherein the code in combination with said computing system is capable of performing the method of claim 1.

16. A computer program product, comprising a computer hardware storage device storing a computer readable program code, said computer readable program code configured to perform a method upon being executed by a processor of a computing system, said method comprising:

broadcasting, by said computer processor for a user, a video stream comprising plurality of timestamps located at specified intervals of said video stream;

during said broadcasting, first decoding by said computer processor, a first time stamp of said plurality of time stamps, said first time stamp broadcasted during a first time period;

during said first decoding, monitoring by said computer processor, a first user interaction function associated with said video stream, said first user interaction function performed by said user during a broadcast of a first portion of said video stream, said broadcast of said first portion of said video stream occurring at said first time stamp;

first determining, by said computer processor, based on said first user interaction function and additional previous user interaction functions, various portions of said video stream that have been actively viewed by said user;

second determining, by said computer processor, based on results of said first determining, video portions of additional video for adding to said video stream;

generating, by said computing system, a report, said report comprising a first description comprising analysis associated with said first user interaction function, said additional previous user interaction functions, and said first time period associated with said first time stamp, wherein said first description comprises first measurements associated with said first user interaction function, wherein said first measurements are configured to be compiled into usage statistics and viewing patterns associated with said video stream, and wherein said first measurements comprise:

measuring a window focus percentage, through method calls to an operating system, occurring during said broadcast of said first portion of said video stream;

measuring a mouse movement occurring during said broadcast of said first portion of said video stream, wherein said mouse movement occurs within and external to a video window broadcasting said first portion of said video stream; and measuring an average volume level for an audio stream associated with said video stream occurring during said broadcast of said first portion of said video stream; and transmitting, by said computer processor to an analysis computing system, said report; and receiving, by said computer processor from said analysis computing system, an analysis associated with said report.

17. The computer program product of claim 16, wherein said method further comprises:

receiving, by said computer processor from said analysis computing system, instructions associated with said analysis and said video stream; and presenting, by said computer processor to said user, said instructions.

18. The computer program product of claim 16, wherein said method further comprises:

receiving, by said computer processor from said analysis computing system, instructions associated with said analysis and said video stream; and automatically enabling, by said computer processor in response to said instructions, specified functions associated with said broadcasting said video stream.

19. The computer program product of claim 16, wherein said method further comprises:

comparing, by said computer processor, said first time period to a reference time period to determine a difference between said first time period and said reference time period, wherein said report comprises said difference.

20. A computing system comprising a computer processor coupled to a computer-readable memory unit, said memory unit comprising a computer readable code configured to be executed by the computer processor to perform a method comprising:

broadcasting, by said computer processor for a user, a video stream comprising plurality of timestamps located at specified intervals of said video stream;

during said broadcasting, first decoding by said computer processor, a first time stamp of said plurality of time stamps, said first time stamp broadcasted during a first time period;

during said first decoding, monitoring by said computer processor, a first user interaction function associated with said video stream, said first user interaction function performed by said user during a broadcast of a first portion of said video stream, said broadcast of said first portion of said video stream occurring at said first time stamp;

first determining, by said computer processor, based on said first user interaction function and additional previous user interaction functions, various portions of said video stream that have been actively viewed by said user;

second determining, by said computer processor, based on results of said first determining, video portions of additional video for adding to said video stream;

generating, by said computing system, a report, said report comprising a first description comprising analysis associated with said first user interaction function, said additional previous user interaction functions, and said first time period associated with said first time stamp, wherein said first description comprises first measurements associated with said first user interaction function, wherein said first measurements are configured to be compiled into usage statistics and viewing patterns associated with said video stream, and wherein said first measurements comprise:

measuring a window focus percentage, through method calls to an operating system, occurring during said broadcast of said first portion of said video stream;

measuring a mouse movement occurring during said broadcast of said first portion of said video stream, wherein said mouse movement occurs within and external to a video window broadcasting said first portion of said video stream; and measuring an average volume level for an audio stream associated with said video stream occurring during said broadcast of said first portion of said video stream; and transmitting, by said computer processor to an analysis computing system, said report; and receiving, by said computer processor from said analysis computing system, an analysis associated with said report.

* * * * *